United States Patent [19]
Ivancic

[11] Patent Number: 5,199,524
[45] Date of Patent: Apr. 6, 1993

[54] AUTOMATED GUIDED VEHICLE

[75] Inventor: Milan E. Ivancic, Willoughby, Ohio

[73] Assignee: Mentor AGVS, Inc., Mentor, Ohio

[21] Appl. No.: 723,902

[22] Filed: Jul. 1, 1991

[51] Int. Cl.⁵ .......................................... B60K 17/358
[52] U.S. Cl. .................................... 180/237; 180/242;
180/264; 180/65.6
[58] Field of Search ................ 280/80.1; 180/234, 237,
180/242, 264, 266, 308, 65.6, 65.7

[56] References Cited
U.S. PATENT DOCUMENTS

| | | | |
|---|---|---|---|
| 1,321,612 | 11/1919 | Flavin | 180/237 X |
| 3,669,202 | 6/1972 | Andersen | 180/237 |
| 3,804,189 | 4/1974 | Smith | 180/234 X |
| 5,112,183 | 5/1992 | Nusbaum | 180/234 X |

FOREIGN PATENT DOCUMENTS 0652362 11/1985 Switzerland .................. 180/234

Primary Examiner—Margaret A. Focarino
Assistant Examiner—Carla Mattix
Attorney, Agent, or Firm—Body, Vickers & Daniels

[57] ABSTRACT

An automated guided vehicle for carrying and moving heavy loads providing the vehicle with a gross weight of more than about 100 tons includes a vehicle platform or deck for carrying the loads and wheel assemblies at either end of the platform for both steering and driving the vehicle along a predetermined path. Each of the wheel assemblies includes a differential gear assembly and a drive arrangement therefor for driving the wheels, and each wheel assembly includes a drive arrangement for rotating the wheel assembly to steer the vehicle. Suspension arrangements are disclosed for supporting the vehicle against the imposition of undesirable forces on the wheel assemblies during loading.

28 Claims, 7 Drawing Sheets

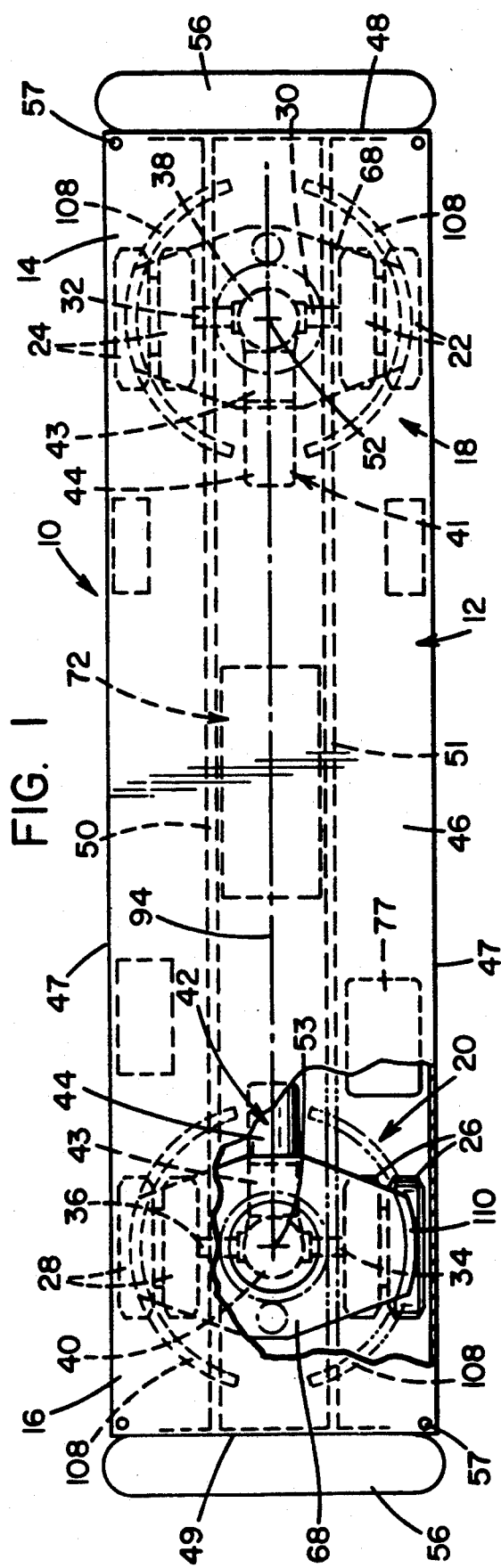

AUTOMATED GUIDED VEHICLE

This invention relates to an automated guided vehicle (AGV) and more particularly to the steering and drive assembly for an automated guided vehicle that carries and moves loads over about 100 tons.

BACKGROUND OF THE INVENTION

Automated guided vehicles, an unmanned vehicle capable of following an external guidance signal to deliver a unit load from destination to destination, has become a key element in the rapid growth in industrial automation of factories. The AGVs are particularly useful in transporting materials in warehouses, factories and other commercial and industrial settings. The AGV systems are capable of operating around the clock and have a tremendous impact on productivity.

The AGVs are very advantageous, primarily because of their adaptability and flexibility. Adaptability refers to the ability of AGV systems to be configured for the specific facility and material flow requirements of any particular operation at which the system is installed. Flexibility refers to the reduction in risks of obsolescence and increased utilization of the complete automation system. The specific areas of flexibility include, but are not limited to, volume flexibility, schedule flexibility, hardware flexibility, software flexibility, etc. Other advantages of AGV systems include real time control for responding to requests, floor space savings, ease of installation, reduction in labor costs, higher quality, reduced energy costs and many others.

The major classifications of AGVs include: driverless trains, such as tow vehicles; pallet vehicles; unit load vehicles, such as flat bed vehicles; fork-type vehicles; light weight limit load vehicles; and, special vehicles. The first five classifications are considered standard and have been developed for a broad range of applications. The special vehicles, on the other hand, are customized for specialized applications.

The average capacity of an AGV is between about one to three tons. Some of the heavy payload AGVs have a capacity of about 50 tons and are classified as high capacity, special vehicles. These vehicles are used to move items such as dies, coiled steel, sheet steel and rolls of paper which were previously handled and transported by overhead cranes.

The use of AGVs with a very high capacity of above about 100 tons, until now, has been hampered by design problems including those relating to the drive, steering and suspension. The very high capacity AGVs are particularly suitable for movement of extremely heavy rolls of material such as parent rolls of paper or coils of steel or aluminum, dies, ingots and casks. Also, AGVs for use with such a high capacity are often operated out of doors and must be able to handle the uneven roadway surfaces and the hostile weather conditions which are encountered. That is, the drive and steering mechanism must be able to operate at a reasonable speed while negotiating the turns, the rough road surfaces and the effects of weather, such as ice on the roadway. For example, this type of very high capacity AGV must particularly be suitable for handling large shipping containers at docks where they are loaded on or unloaded from ships and often stacked upon each other.

In the past, a variety of drive-steering geometries were available for steering and maneuvering. Examples include tricycle wheel geometry, dual triangle wheel geometry, differential drive wheel geometry and four-wheel steering geometry. Each of these steering systems, while being suitably operable for the smaller, prior art AGVs, has certain limitations and deficiencies when use in conjunction with the very high capacity AGVs capable of handling over 100 tons to which the present invention is related.

The tricycle wheel geometry comprises three wheels with two idle wheels at the rear of the vehicle and a drive wheel at the front center of the vehicle. This wheel configuration does not track well and the single drive wheel is likely to slip when the traction is poor due to floor conditions such as unevenness or wetness. Also, the vehicle using this drive configuration can be unstable unless the load is carefully positioned.

The dual tricycle wheel geometry is constructed of two tricycle wheel assemblies, as just described. The independent steering and drive wheels are disposed in the front and rear of the vehicle with the caster wheels on the sides of the vehicle. This wheel configuration can be difficult to steer because the caster wheels have a tendency to remain in a set position due to the weight of the load.

Differential drive wheel geometry includes two fixed, independently-driven drive wheels mounted in the vehicle's center towards the outside of the vehicle, with caster wheels at the corners to provide stability. The vehicle is steered by varying the speed and direction of each drive wheel. This system is not suitable for extremely heavy loads because only two drive wheels are not adequate to deliver enough drive force to the floor to properly drive a heavy loaded vehicle. Also, the uneven surfaces on which the very high capacity AGVs are operated, can cause one or both of the drive wheels to slip or be out of contact with the drive floor and thereby impede the control and operation of the AGV.

Four wheel steering geometry combines the steering and drive functions in each of the four wheels, wherein each of the wheels is located at a corner of the AGV. This is a typical arrangement for the normal heavy payload applications, i.e. up to about 50 tons. However, when this arrangement is adapted for an AGV with a load above about 100 tons and especially for use outdoors, it becomes deficient because one or more of the drive and steering wheels may not make adequate contact with the ground due to factors such as unevenness or slick road surfaces.

Another problem encountered in connection with the use of prior art AGVs for heavy loads relates to the suspension systems for the wheels and especially the drive wheels, each of which is independently connected to the vehicle for driving and steering. When a heavy load is loaded onto the AGV, by means such as a crane, special devices have to be incorporated into the system to absorb the shock of loading as well as the forces imposed on the suspension system by the heavy load during operation of the vehicle.

SUMMARY OF THE INVENTION

The present invention contemplates a new and improved steering and drive system for use with an AGV having a very high capacity of over about 100 tons which overcomes all of the above-referred to problems and provides the AGV onto which it is mounted with accuracy in its steering, positive drive through each wheel, and ability to operate in inclement, weather conditions.

In accordance with one aspect of the invention, the AGV is constructed of a vehicle platform or deck for supporting loads of approximately 100 tons or more and wheel assemblies are provided under both ends of the platform or deck for steering and driving the vehicle along a predetermined path. Each of the wheel assemblies preferably includes two pairs of wheels attached to separate axles. A differential gear box is disposed between and connected to each pair of the axles to enable the corresponding wheels to rotate at the same or different speeds with respect to each other. A drive mechanism is affixed to each of the wheel assemblies for driving the differential gear box.

Also in accordance with the invention, each of the wheel assemblies includes a steering apparatus for turning the respective wheel assembly about a corresponding vertical axis. Each steering apparatus preferably includes a motor driven pinion mounted on the wheel assembly for rotation therewith and a ring gear fixed to the vehicle deck and in meshed engagement with the pinion, whereby rotation of the pinion rotates the wheel assembly about the ring gear and the vertical axis. The ring gear can be provided with threads which extend about 180° around its outer peripheral surface whereby the wheel assembly can rotate about 180°. Preferably, bearings are provided between the vehicle deck and the wheel assemblies to enhance the ease of steering the AGV.

The AGV is approximately 45 feet long and about 10 feet wide. A vehicle of this size can weigh in the range of about 20,000 to 30,000 pounds and, in accordance with the present invention, can carry loads providing a gross weight in excess of 200,000 pounds. A diesel operated generator capable of producing about 250 volts DC and a current of about 300 amps is carried aboard the AGV to generate power for on board equipment including the wheel driving and steering motors. A fuel tank is also carried aboard the AGV for running the diesel powering the generator. Various controls and batteries are also provided on board the AGV to operate the AGV as is conventionally known.

In accordance with a further aspect of the invention, suspension device are operatively connected between the deck structure and the wheel assemblies to absorb high impact forces resulting from the loading of the deck and to restrain the transfer of the high impact forces to the wheel assemblies. More particularly, as the load, such as a container, is placed onto the deck, such as by a crane, the container is often dropped onto the deck, whereby very high impact forces are transmitted to the wheel assemblies. These forces can damage or break the wheel assemblies and, to avoid such damage or breakage, a plurality of suspension devices, such as shock absorbers and springs, or air bags, for example, are provided between the deck and wheel assemblies to absorb the impact forces. In accordance with yet another aspect of the invention, shock absorbing devices can be mounted on the deck and operated to engage the ground beneath the loaded vehicle to assist in absorbing the impact forces during loading.

Accordingly, it is an outstanding object of the present invention to provide an automated guided vehicle capable of carrying loads providing for the gross weight of the vehicle to be over 100 tons.

It is a further object of the present invention to provide an automated guided vehicle having wheel assemblies which facilitate the ease of driving and guidance of a vehicle of the foregoing character.

Another object is to provide an automated guided vehicle of the foregoing character with a differential wheel drive arrangement enabling the wheels to rotate at different speeds with respect to each other to facilitate driving and steering of the vehicle.

It is also an object of the present invention to provide an automated guided vehicle having wheel assemblies at opposite ends of the vehicle which are rotatable about corresponding vertical axes and which include corresponding differential drive arrangements that enable the wheels of each assembly to rotate at different speeds, thus to optimize steering of the vehicle.

It is yet a further object of the present invention to provide an automated guided vehicle of the foregoing character with a shock absorbing arrangement to absorb the shock of forces imposed thereon during loading of the vehicle.

It is a further object of the present invention to provide an automated guided vehicle of the foregoing character with shock absorbing devices between the deck of the vehicle and the wheel assemblies and/or between the deck and the ground on which the vehicle is supported to absorb forces imposed on the vehicle during loading.

BRIEF DESCRIPTION OF THE DRAWINGS

The foregoing and other objects and advantages of the present invention will become apparent from the following description taken in conjunction with the accompanying drawings in which:

FIG. 1 is a top view, partially in section, schematically illustrating the wheel assemblies and drive and steering mechanisms of an AGV in accordance with the present invention;

FIG. 2 is a side view partially in section, of the AGV illustrated in FIG. 1;

DESCRIPTION OF PREFERRED EMBODIMENTS

Figure 4:
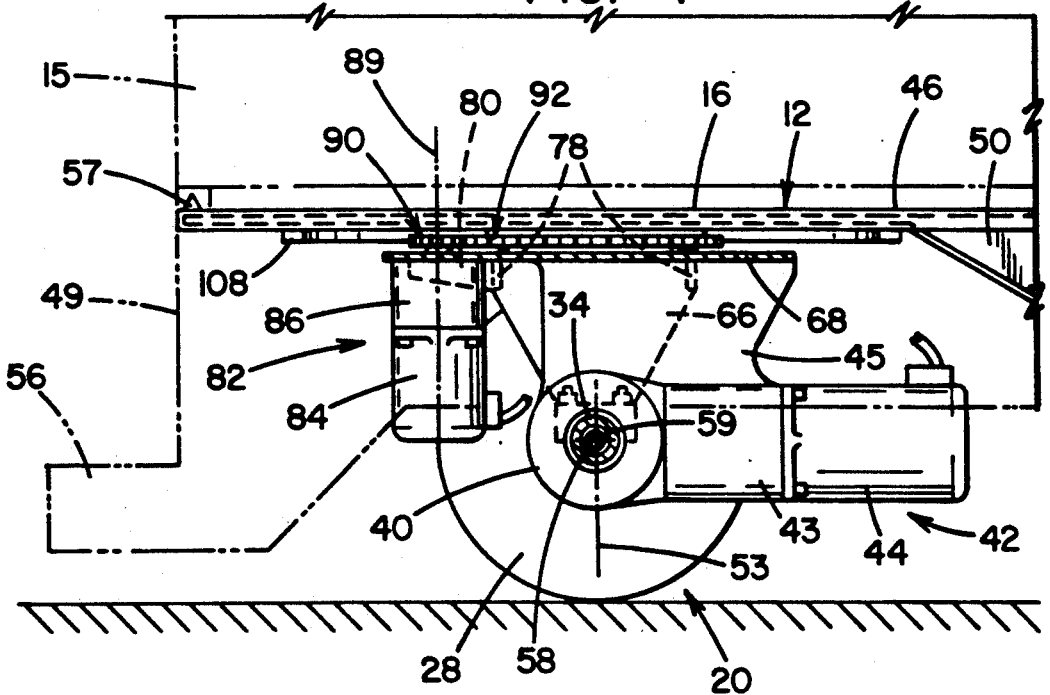
FIG. 4 is a sectional elevation view of the driving and steering mechanism taken along line 4—4 of FIG. 3.
Figure 5:
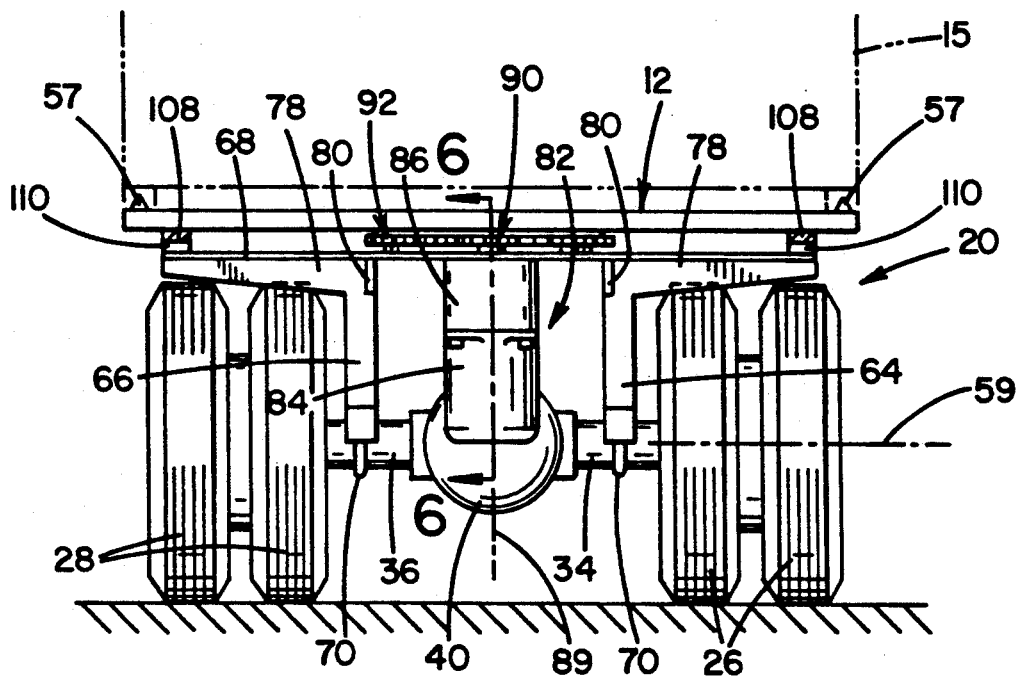
FIG. 5 is an end elevation view of the AGV looking in the direction from left to right in FIG. 1.
Figure 6:
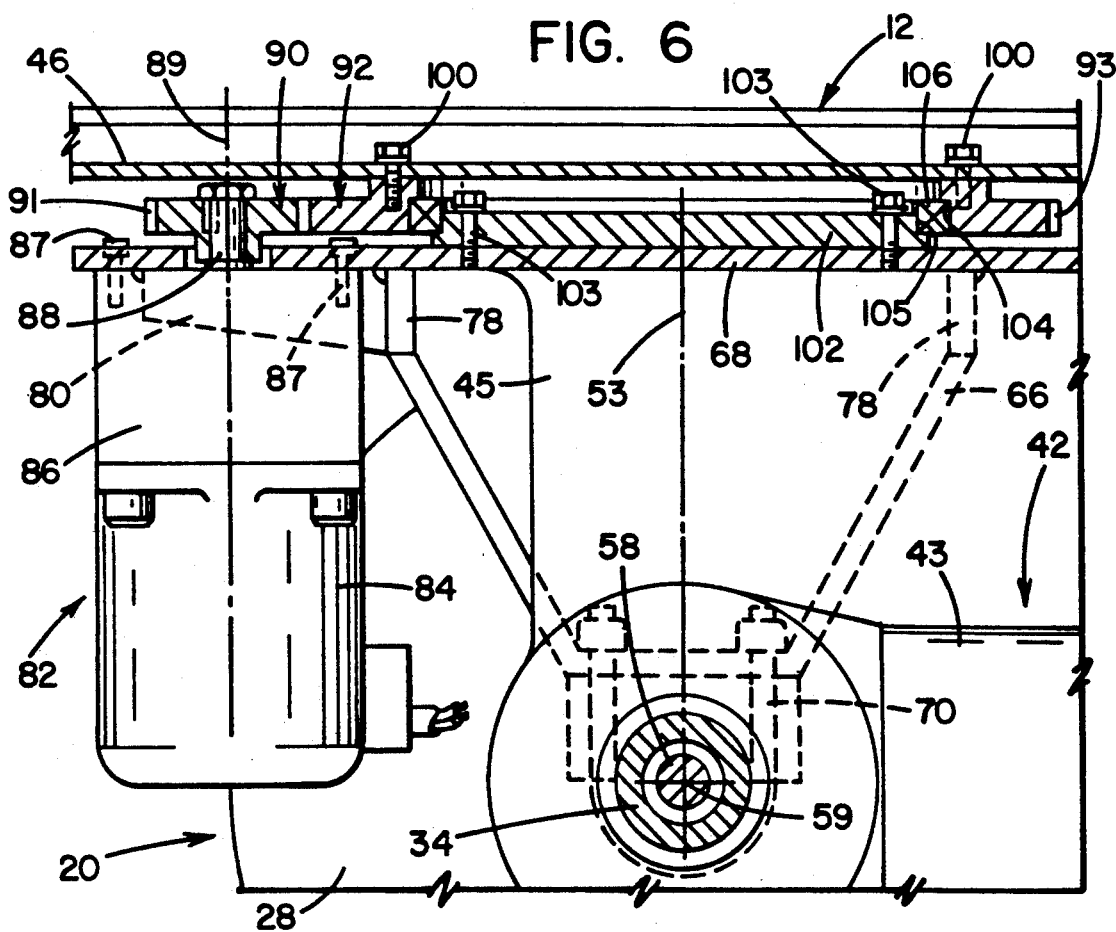
FIG. 6 is an enlarged sectional elevation view taken along line 6—6 in FIG. 5.

Referring now in greater detail to the drawings wherein the showings are for the purpose of illustrating preferred embodiments of the invention only and not for the purpose of limiting the invention, an automated guided vehicle 10 in accordance with the present invention comprises a vehicle deck structure 12 for supporting a load to be transported by the vehicle such as, for example, a shipping container 15. At opposite ends of deck 12, designated as the front and rear ends 14 and 16, respectively, there are provided substantially identical wheel assemblies 18 and 20, aligned along longitudinal axis 94, for both steering and driving the vehicle along a predetermined path. Each of the wheel assemblies includes a support plate 68 by which the wheel assembly is mounted on deck 12, described more fully hereinafter. Front wheel assembly 18 preferably comprises pairs of wheels 22 and 24, and rear wheel assembly 20 preferably comprises pairs of wheels 26 and 28. The pairs of wheels 22 and 24 are each connected to corresponding axially aligned axles, not shown, disposed in and rotatably supported by front axle housings 30 and 32, respectively. Similarly, the pairs of wheels 26 and 28 are connected to axially aligned axles 58 which, as best seen in FIGS. 4-6, are disposed in and rotatably supported by rear axle housings 34 and 36. Differential gear assemblies 38 and 40 and corresponding differential drive devices 41 and 42 are mounted on support plates 68 by mounting brackets 45. The differential gear assemblies are of conventional construction and are respectively connected between the pair of axles in housings 30 and 32 and the axles 58 in housings 34 and 36 and, as is well known, enable each of the axle pairs and corresponding wheels to rotate at the same or different speeds with respect to each other. Differential drive devices 41 and 42 are drivingly connected to differential gear assemblies 38 and 40, respectively, for driving the latter, and each of the drive devices includes a transmission 43 and a drive motor 44 therefor which, preferably, is a DC motor having a power rating of about 8 to about 90 horsepower and preferably about 45 horsepower. As will be described more fully hereinafter, wheel assemblies 18 and 20 are mounted on deck 12 for rotation about vertical axes 52 and 53 respectively.

As seen in FIGS. 1 and 2, deck structure 12 includes a generally planar upper floor plate 46 of sheet steel, for example, and preferably includes side walls 47 and front and rear walls 48 and 49, respectively, extending downwardly about the periphery of floor plate 46. Parallel frame supports 50 and 51 underlie floor 46 and extend the length of the AGV as seen in FIG. 1. The supports 50 and 51 are vertically wider in their central portion, as seen in FIG. 2, than at the ends thereof, and the space between each end and the central portion accommodates the corresponding one of the wheel assemblies 18 and 20. Bumpers 56 are attached to the front and rear walls 48 and 49, and lugs 57 are provided on floor 46 to facilitate positioning a load thereon and to keep the load from shifting positions.

As mentioned above, front and rear wheel assemblies 18 and 20 are substantially identical. Accordingly, it will be appreciated that the following description of rear wheel assembly 20 as seen in FIGS. 3-7 is also applicable to front wheel assembly 18. As also mentioned above, axles 58 are disposed in and rotatably supported by axle housings 34 and 36. The axles rotate about a common axis 59 and are connected to the differential gear assembly 40 at their inner ends and to the corresponding pair of wheels 26 and 28 at their outer ends. Axle housings 34 and 36 are respectively secured to the lower ends of legs 64 and 66 which in turn are attached, such as by welding, to the support plate 68. More particularly, U-shaped clamps 70 are disposed about axle housings 34 and 36 and bolted to the lower ends of legs 64 and 66. Support plate 68 is rigidified by plates 78 extending laterally outwardly from legs 64 and 66 and by plates 80 extending longitudinally from the legs toward the corresponding end of the deck.

Figure 3:
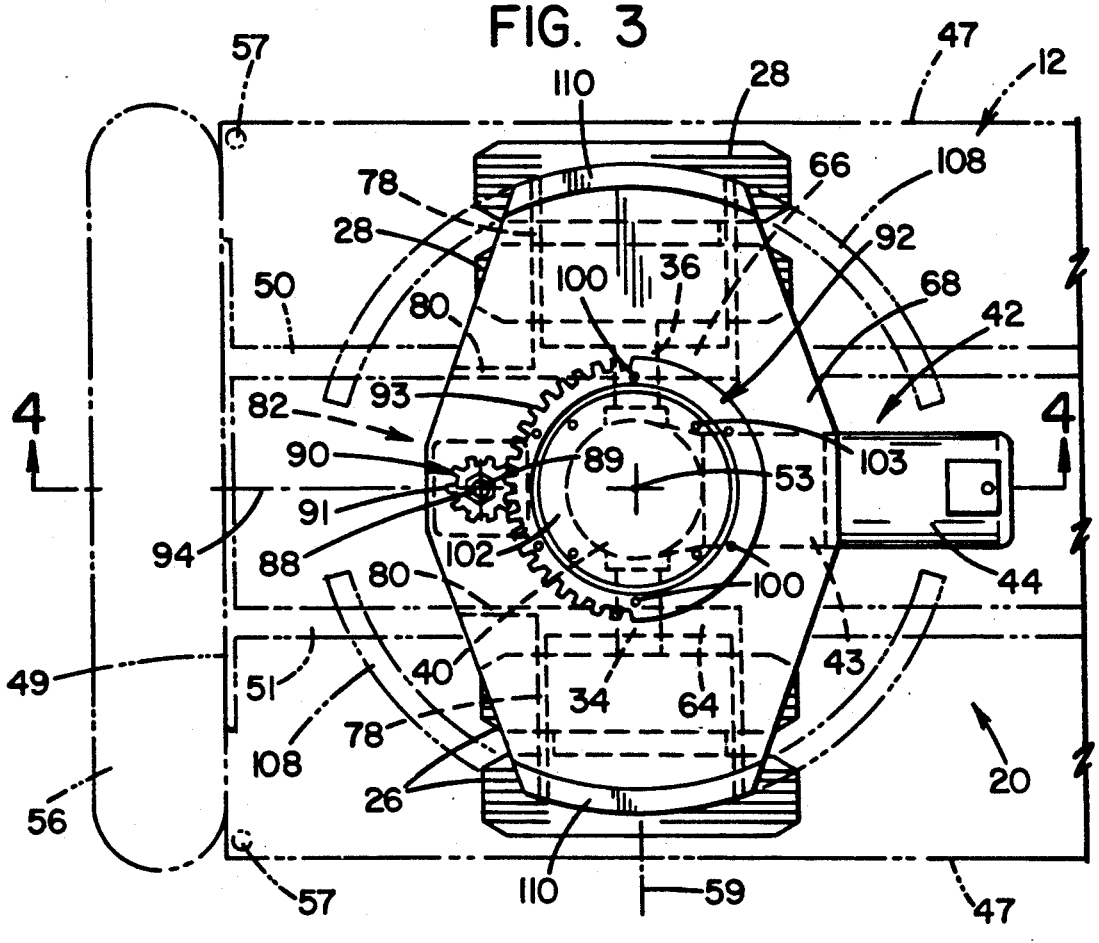
FIG. 3 is an enlarged plan view of the rear wheel and driving and steering mechanism.
Figure 7:
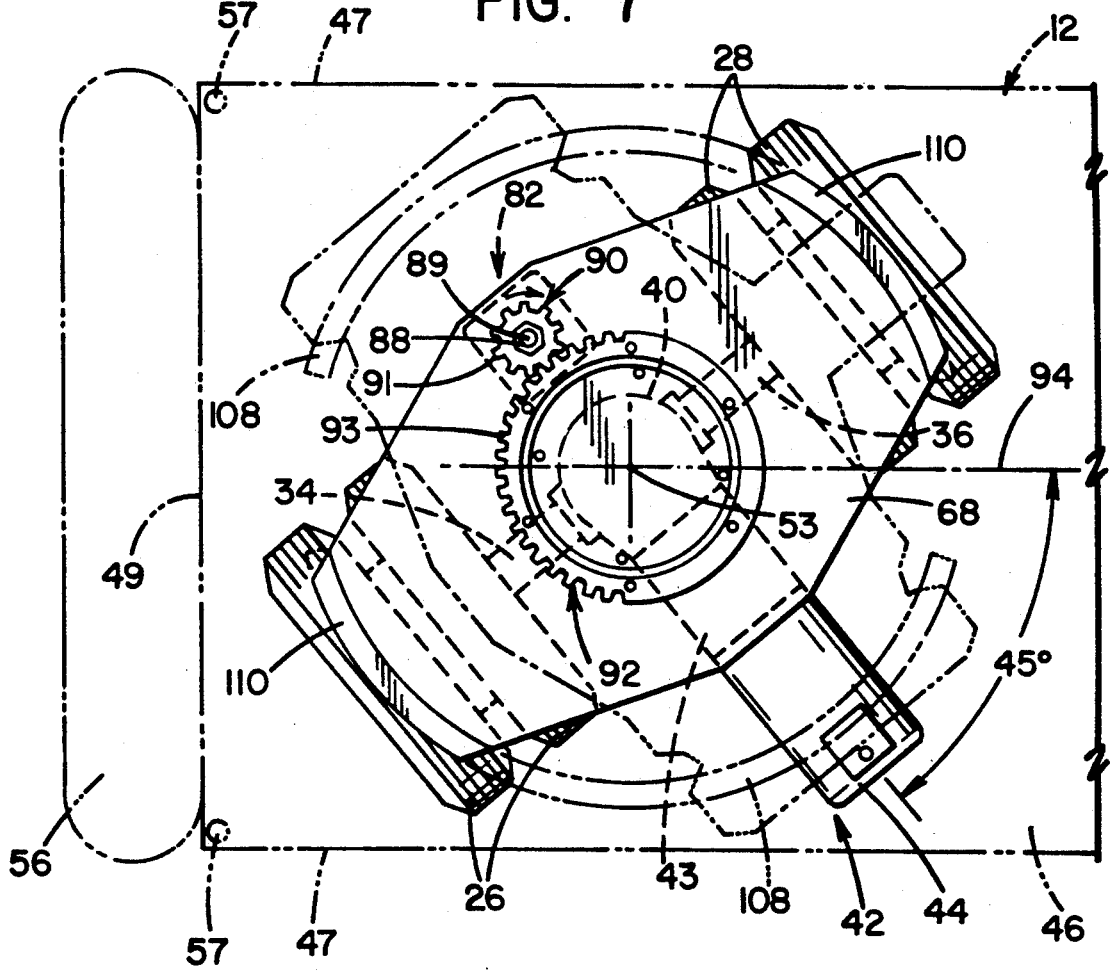
FIG. 7 is an enlarged, plan view of the rear wheel assembly and illustrating different rotational positions of the wheel assembly to effect turning of the AGV.

A steering motor assembly 82 is mounted on support plate 68 for rotating wheel assembly 20 about vertical axis 53. The steering motor assembly includes a motor 84, preferably a DC electric motor of approximately 25 horsepower. The steering motor 84 is connected to a steering transmission 86 mounted on support plate 68 by bolts 87, and the transmission has an output shaft 88 extending therefrom and to which a pinion gear 90 is fixed for rotation about a vertical axis 89. The pinion gear has teeth 91 which mesh with teeth 93 of a large ring gear 92 mounted on deck plate 46. Teeth 93 of ring gear 92, as seen in FIGS. 3 and 7 preferably extend about 180° of the circumference of the gear, enabling the wheels to rotate approximately 90° in opposite directions about axes 53 from the positions of the wheels shown in FIG. 3. The ring gear 92 is securely mounted to the underside of deck plate 46 by bolts 100, whereby it will be appreciated that the rotation of pinion gear 90 causes the steering motor assembly 82 to "walk" around the ring gear 92 and, therefore, support plate 68 and wheel assembly 20 to pivot about axis 53.

To facilitate the support and rotation of support plate 68, as best seen in FIG. 6, a bearing plate 102 is mounted on the upperside of plate 68 within ring gear 92, such as by bolts 103, and an annular bearing unit 106 is interposed between shoulders 104 and 105 respectively on ring gear 92 and bearing plate 102 to enable the wheel assembly 20 to rotate smoothly in response to the rotation of pinion gear 90. Further support for rotation of support plate 68 is provided by semi-circular shaped bearing plates 108 secured to the underside of deck plate 46 near the outer edges of deck structure 12, and bearings plates 110 which are in sliding contact with plates 108 and securely attached to the upperside of support plate 68 at the outer ends thereof.

As will be seen from FIGS. 1 and 2, electric power for drive motors 44 and 84, as well as other electric equipment on the AGV 10 is provided by a power source 72 which is preferably attached to the supports 50 and 51 and includes an electric generator 74. The generator 74 is preferably driven by a diesel engine 76 and develops about 250 volts DC and approximately 300 amps. The diesel engine can develop about 100 horsepower and uses fuel carried on board the AGV by fuel tank 77.

Figure 8:
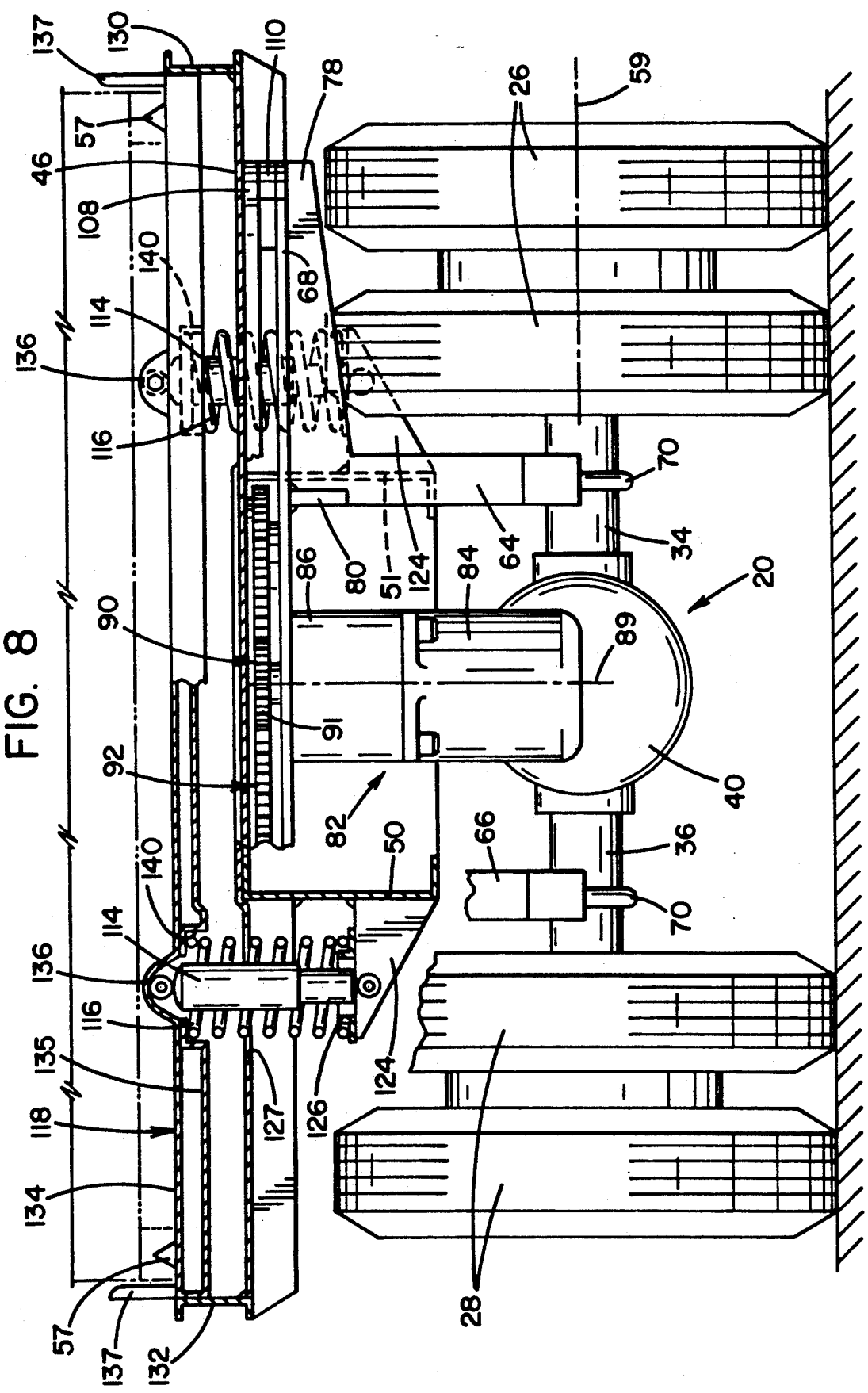
FIG. 8 is an enlarged sectional elevation view of the rear wheel assembly and deck of the AGV and illustrating a suspension system therebetween.

A suspension system between the deck and wheel assemblies of the AGV is illustrated in FIG. 8, wherein like numerals identify elements corresponding to those described above in conjunction with FIGS. 1-7. In FIG. 8, oil or gas filled shock absorbers 114 surrounded by coil springs 116 provide for the deck structure 118 to move relative to the rear wheel assembly 20 and absorb downward forces caused for example by a heavy load being dropped onto the deck. It is understood that while the shock absorber arrangements are shown in conjunction with rear wheel assembly 20, similar shock absorbers are associated with front wheel assembly 18. The deck in this embodiment includes a stationary lower deck portion, including deck plate 46 to which the ring gear 92 is attached as discussed hereinbefore, and the frame supports 50 and 51 which are secured to the underside of deck plate 46. Side supports 130 and 132 are secured to the edges of deck plate 46 and extend the length of the deck. Between the supports 130 and 132 is a floating upper deck structure 118 which is constructed of spaced upper and lower steel plates 134 and 135, respectively, that are suitably jointed together in spaced relationship such as by a honeycomb support therebetween, not shown. On the top surface of the upper deck are lugs 57 which, as described earlier, locate and retain containers on the deck. In addition, upward extending elements 137 are secured to the longitudinal edges of the upper deck structure along the length of the deck to prevent any lateral displacement of the load relative to the upper deck structure which could interfere with the floating movement of the upper deck relative to the lower deck. Upper deck structure 118 is mounted between the side supports 130 and 132 and is free to move up and down in a vertical direction therebetween.

The upper deck plate 134 includes concave shaped domes 136 to which the upper ends of shock absorbers 114 are secured, and lower deck plate 135 includes downwardly open cylindrical recesses 140 aligned with and underlying domes 136 to receive the upper ends of the coil springs 116. The frame supports 50 and 51 are provided with support brackets 124 which project outwardly from the supports beneath domes 136 and recesses 140 to support the lower ends of both the shock absorbers 114 and the springs 116. More particularly, in this respect, the lower ends of shock absorbers 114 are attached to brackets 124, and the upper sides of the brackets are provided with flanged sleeves 126 receiving the lower ends of springs 116. The shock absorbers and springs extend through corresponding openings 127 provided therefor in lower deck plate 46.

In operation, when a load is dropped onto the upper deck 118, the floating upper deck moves towards the fixed lower deck portion and compresses the springs 116 and shock absorbers 114. The shock absorbers absorb a significant amount of the force and in cooperation with the springs 116, minimize the transfer of the high load forces to the wheel assembly, thereby protecting the latter, including the steering and drive mechanisms from damage or breakage.

Figure 9:
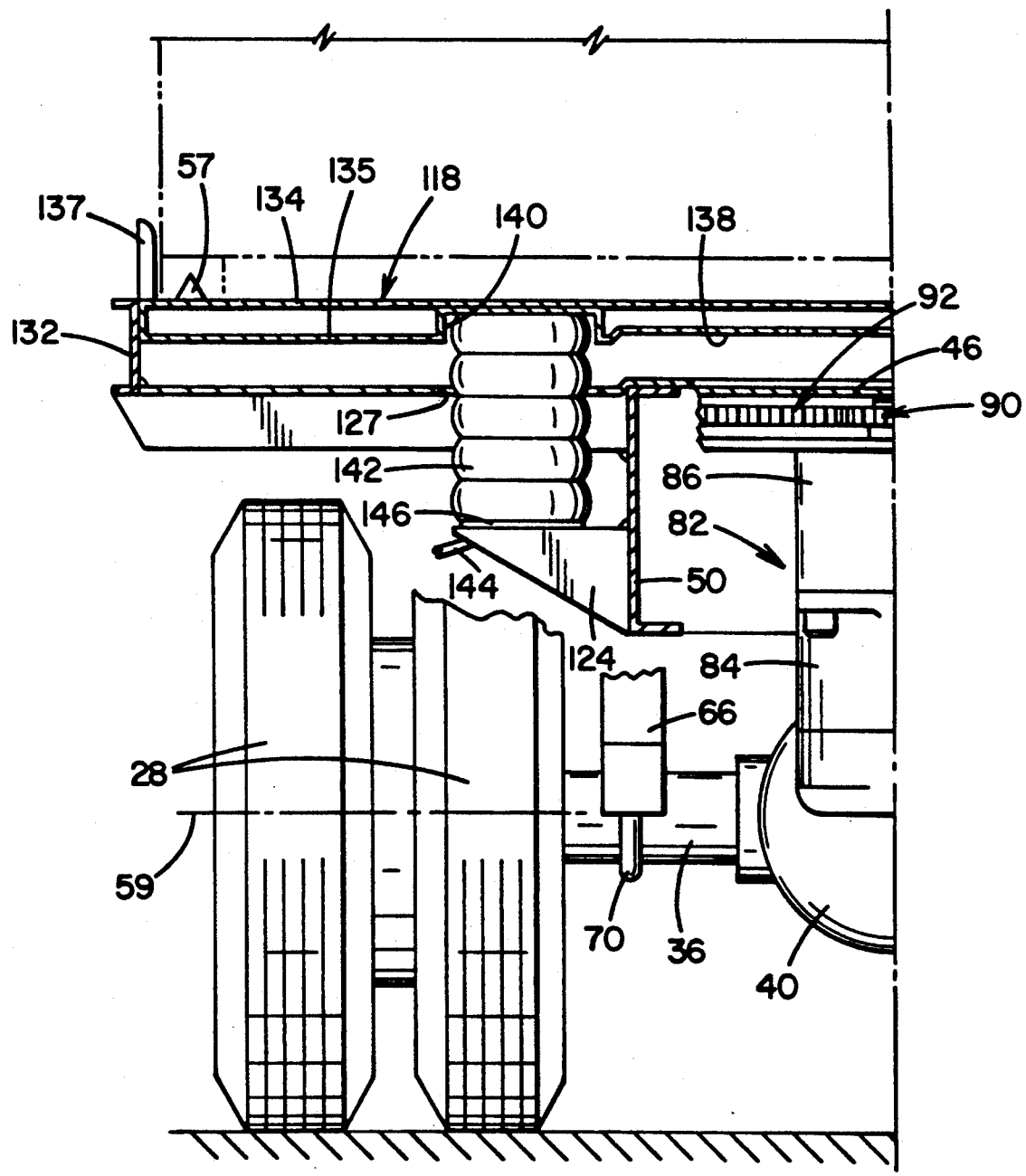
FIG. 9 is an enlarged view of a portion of the vehicle shown in FIG. 8 and illustrating another embodiment of a suspension system for the vehicle.

In FIG. 9, there is illustrated a modification of the suspension system shown in FIG. 8 and wherein air bags are employed to absorb the forces generated by placing a load on the deck of the AGV. It will be appreciated that the air bag shown in FIG. 9 is also used in place of the spring and shock absorber on the other side of wheel assembly 20, and that the air bag arrangement is also applicable to the front wheel assembly 18. This embodiment is substantially identical to that illustrated in FIG. 8 except that an air bag type shock absorber 142 replaces both the coil spring 116 and shock absorber 114 of the suspension units in FIG. 8. The air bag 142 is typically constructed of rubber and is filled with air by a conventional air pump, not shown through an air line 144. In mounting the air bag 142 between support bracket 124 and the bottom side 138 of the floating upper deck portion, a cylindrical support 146 is affixed to the upper end of bracket 124 for supporting the lower end of the air bag 142 and the upper end of the air bag is received in recess 140 in lower deck plate 135. Both the air bag and shock absorber arrangements can be controlled so as to an automatically level the deck of the AGV in accordance with particular load requirements.

Figure 10:
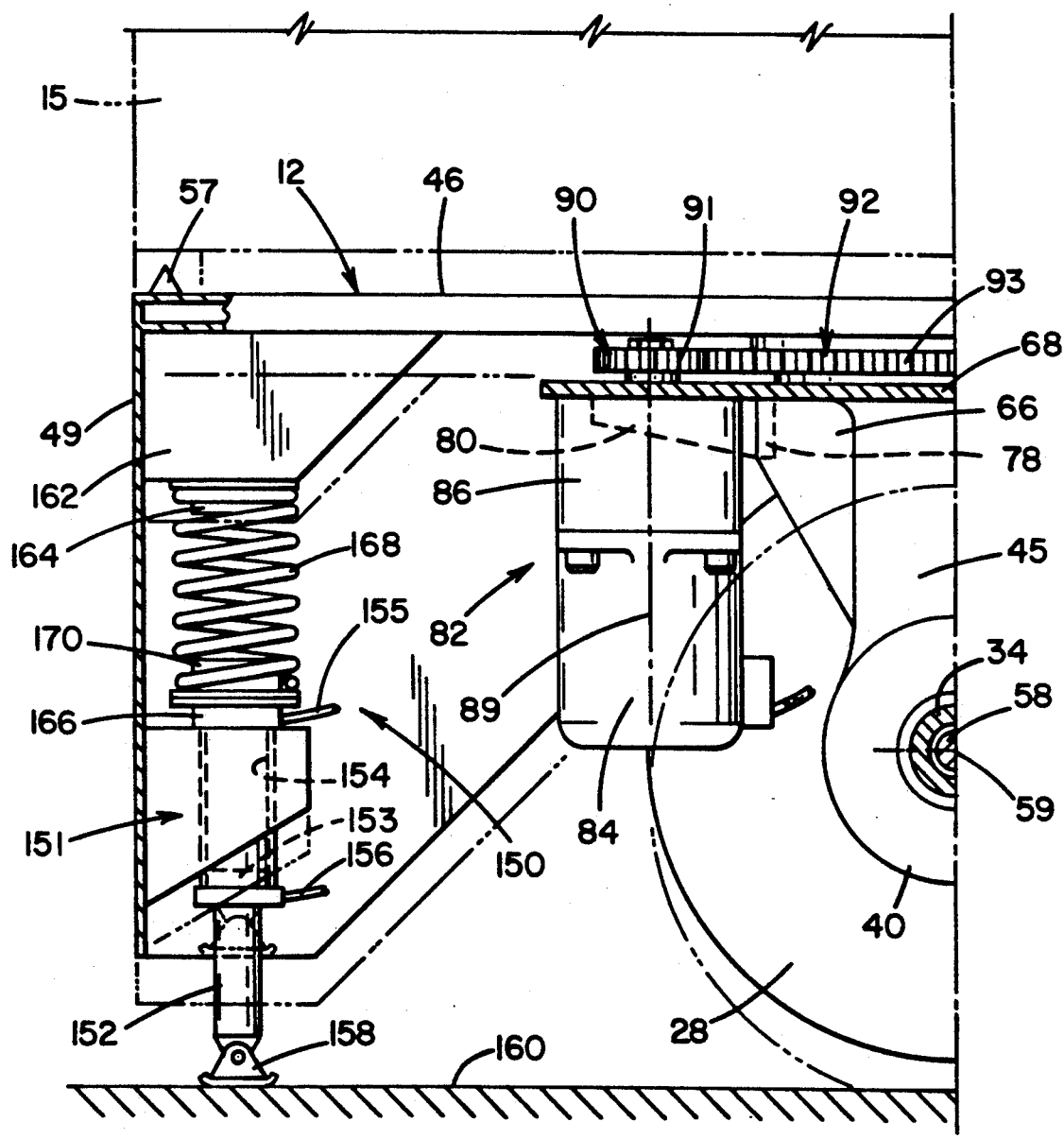
FIG. 10 is an enlarged elevation view, partially in section, of an arrangement for supporting the deck of the vehicle relative to ground.

FIG. 10 illustrates an embodiment of the invention wherein a hydraulic jack and compression spring assembly 150 is provided to protect the wheel assemblies of the AGV 10 during loading. Though a single assembly 150 is illustrated, it will be appreciated that at least four such assemblies, one at each corner of the AGV, will be used. If desired, additional jack assemblies can be included. The assembly includes a jack 151 having a gas or oil actuated, reciprocating piston rod 152 attached to piston 153 in chamber 154. The piston is reciprocal in chamber 154 by directing gas or oil alternately through lines 155 and 156. The lower end of piston rod 152 has a pivotable foot support 158 for engaging against an underlying surface 160 when rod 152 is extended, as illustrated in FIG. 10. A support member 162 is secured to the deck structure of the AGV, which may be the deck structure 12 in FIGS. 1-7 or the lower portions of the deck structures in FIGS. 8 and 9, and cylindrical support 164 is secured to support member 162. Assembly 150 further includes a compression spring 168 between support 164 and jack 151 having its upper end surrounding and supported by member 164. The lower end of spring 168 is suitably secured to the upper end of jack 151, such as by a mounting plate 166 on the jack having a projection 170 receiving the spring which is suitably secured thereto.

In operation, prior to a heavy load being placed onto the deck structure, the hydraulic jacks are operated so that the support feet 158 thereof contact the underlying surface 160 and raise the corners of the AGV, including the wheels, to the solid line position illustrated in FIG. 10 in which the wheels are raised above surface 160. When a load is dropped onto the deck, the shock is absorbed by the spring 168 and is not transmitted to the wheel assemblies since the wheels thereof are not in contact with the surface 160. Although the jack and compression spring assembly 150 is shown alone in FIG. 10, other suspension arrangements, such as those shown in FIGS. 8 and 9, can be used in conjunction therewith.

The invention has been described with reference to preferred embodiments and it is apparent that many modifications can be incorporated into the design and assembly of the automated guided vehicle disclosed herein without departing from the essence of the invention. It is intended to include all such modifications and alterations insofar as they come within the scope of the present invention.

Having thus described the invention, it is claimed:

1. An automated guided vehicle for carrying and moving loads comprising:
   deck means for supporting loads to be transported by said vehicle and having longitudinally opposite first and second ends;
   first and second wheel assembly means respectively at said first and second ends of said deck means for steering and driving said vehicle along a predetermined path;
   said first and second wheel assembly means being supported by said deck means for rotation independent of each other about a corresponding vertical axis and each comprising at least two wheels aligned and laterally spaced from each other, each of said two wheels being connected to a corresponding axle;
   first and second differential gear means respectively connecting the axles of said two wheels of said first and second wheel assembly means;
   first and second differential drive means for respectively independently driving said first and second differential gear means to rotate the corresponding axles and wheels; and
   first and second steering means for respectively independently rotating said first and second wheel assembly means about said corresponding vertical axis.

2. An automated guided vehicle as defined in claim 1, wherein each said first and second differential drive means includes a differential drive motor and a differential drive transmission drivingly connected to the corresponding differential gear means.

3. An automated guided vehicle as defined in claim 2, wherein said differential drive motor is a DC motor.

4. An automated guided vehicle as defined in claim 2, further including a power generator on said deck means for producing electrical power.

5. An automated guided vehicle system as defined in claim 1, wherein each said first and second steering means includes:
   a ring gear mounted on said deck means; and
   a pinion gear and drive means therefor mounted on the corresponding wheel assembly means with said pinion gear in meshing engagement with said ring gear.

6. An automated guided vehicle as defined in claim 5, wherein said drive means for said pinion gear includes a steering drive motor and a steering transmission between said steering drive motor and pinion.

7. An automated guided vehicle as defined in claim 6, wherein said steering drive motor is a DC motor.

8. An automated guided vehicle as defined in claim 5, wherein said ring gear has gear teeth extending about 180° around its periphery.

9. An automated guided vehicle as defined in claim 6, and first and second bearing means respectively between said first and second wheel assembly means and said deck means.

10. An automated guided vehicle as defined in claim 1 wherein each said first and second wheel assembly means includes plate means rotatable about said corresponding vertical axis, the corresponding axles, differential gear means and differential drive means being mounted on said plate means for rotation therewith about said corresponding vertical axis.

11. An automated guided vehicle as defined in claim 10, wherein each said first and second steering means includes a ring gear mounted on said deck means coaxial with said corresponding vertical axis, and a pinion gear and drive means therefor mounted on the corresponding plate means for rotation therewith, said pinion gear being in meshing engagement with said ring gear.

12. An automated guided vehicle as defined in claim 11, and bearing means supporting the plate means of each said first and second wheel assembly means for rotation relative to said deck means about said corresponding vertical axis.

13. An automated guided vehicle as defined in claim 12, wherein said bearing means for each said first and second wheel assembly means includes first bearing means between the corresponding ring gear and plate means and second bearing means between said deck means and the corresponding plate means.

14. An automated guided vehicle as defined in claim 11, wherein each said first and second differential drive means includes a differential drive motor and a differential drive transmission drivingly connected to the corresponding differential gear means.

15. An automated guided vehicle as defined in claim 14, wherein said drive means for said pinion gear includes a steering drive motor and a steering transmission between said steering drive motor and pinion.

16. An automated guided vehicle as defined in claim 1, and shock absorbing means for restraining the transfer of loading forces from said deck means to said wheel assembly means.

17. An automated guided vehicle as defined in claim 16, wherein said deck means includes lower deck means and upper deck means vertically displaceable relative to said lower deck means, said shock absorbing means being between said lower and upper deck means.

18. An automated guided vehicle as defined in claim 17, wherein said shock absorbing means comprises a plurality of shock absorber members and corresponding compression springs between said lower and upper deck means.

19. An automated guided vehicle as defined in claim 17, wherein said shock absorbing means comprises a plurality of air bags between said lower and upper deck means.

20. An automated guide vehicle as defined in claim 16, wherein said shock absorbing means includes a plurality of jack means resiliently mounted on said deck means and extendable to elevate said vehicle relative to an underlying surface.

21. A wheel assembly for an automated guided vehicle comprising:
   support means rotatable about a vertical axis;
   two axles each having an outer end and an inner end;
   means mounting said axles on said support means for rotation therewith about said vertical axis and for rotation relative to one another about a common horizontal axis;
   at least one wheel attached to the outer end of each of said axles;
   differential gear means on said support means between and connected to the inner ends of each of said axles;
   means mounted on said support means for rotation therewith and for driving said differential gear means to drive said axles; and
   means including pinion means on said support means for rotating said support means about said vertical axis.

22. A wheel assembly as defined in claim 21, wherein said means for driving said differential gear means includes a drive motor and transmission means connecting said drive motor to said differential gear means.

23. A wheel assembly as defined in claim 22, wherein said drive motor is an electric motor.

24. A wheel assembly as defined in claim 23, wherein said means for rotating said support means includes gear means fixed relative to said support means, said pinion means on said support means drivingly engaging said gear means, and means on said support means to rotate said pinion means.

25. A wheel assembly as defined in claim 24, wherein said gear means is coaxial with said vertical axis.

26. A wheel assembly as defined in claim 25, wherein said means on said support means to rotate said pinion means includes a pinion drive motor and pinion transmission means connecting said pinion drive motor to said pinion means.

27. A wheel assembly as defined in claim 26, wherein said pinion drive motor is an electric motor.

28. A wheel assembly as defined in claim 27, wherein two wheels are attached to said outer end of each of said axles.

* * * * *